US 8,453,016 B2

(12) United States Patent  (10) Patent No.: US 8,453,016 B2
Sauber  (45) Date of Patent: May 28, 2013

(54) METHODS AND SYSTEMS FOR MANAGING RESPONSE DATA IN AN INFORMATION HANDLING SYSTEM

(75) Inventor: William F. Sauber, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 653 days.

(21) Appl. No.: 11/859,772

(22) Filed: Sep. 23, 2007

(65) Prior Publication Data

US 2009/0083581 A1  Mar. 26, 2009

(51) Int. Cl.
*G06F 11/00* (2006.01)

(52) U.S. Cl.
USPC ............. 714/43; 702/182; 702/183; 702/184; 702/185; 702/186; 714/51; 714/55; 714/56

(58) Field of Classification Search
USPC .......................... 702/182–186; 714/51, 55, 56
See application file for complete search history.

(56) References Cited

U.S. PATENT DOCUMENTS

| | | | |
|---|---|---|---|
| 5,649,098 A * | 7/1997 | Shieh et al. ..................... 714/55 |
| 5,706,425 A * | 1/1998 | Unekawa ........................ 714/55 |
| 5,734,641 A * | 3/1998 | Kawasaki et al. ............. 370/242 |
| 5,978,939 A | 11/1999 | Mizoguchi et al. |
| 6,370,656 B1 * | 4/2002 | Olarig et al. ..................... 714/23 |
| 6,748,559 B1 | 6/2004 | Pfister et al. |
| 6,782,496 B2 * | 8/2004 | Fleming .......................... 714/55 |
| 6,857,086 B2 | 2/2005 | Shaw |
| 6,983,317 B1 * | 1/2006 | Bishop et al. ................. 709/223 |
| 7,178,065 B2 * | 2/2007 | Dinker et al. ................... 714/41 |
| 2002/0133766 A1 * | 9/2002 | Batten et al. .................. 714/718 |
| 2003/0051187 A1 * | 3/2003 | Mashayekhi et al. ............ 714/4 |
| 2003/0065841 A1 * | 4/2003 | Pecone ......................... 710/105 |
| 2003/0097587 A1 * | 5/2003 | Gulick .......................... 713/200 |
| 2003/0196141 A1 * | 10/2003 | Shaw ............................. 714/27 |
| 2003/0212932 A1 * | 11/2003 | Sauber et al. ................. 714/712 |
| 2005/0108187 A1 * | 5/2005 | Fujibayashi ..................... 707/1 |
| 2005/0204183 A1 * | 9/2005 | Saika .............................. 714/4 |
| 2005/0268156 A1 * | 12/2005 | Mashayekhi et al. ............ 714/4 |
| 2006/0080569 A1 * | 4/2006 | Sciacca ............................ 714/4 |
| 2006/0190760 A1 * | 8/2006 | Saika .............................. 714/4 |
| 2007/0159197 A1 * | 7/2007 | Brueckner et al. ............ 324/761 |
| 2007/0291658 A1 * | 12/2007 | Knapik et al. ................ 370/252 |
| 2008/0046785 A1 * | 2/2008 | Gilgen et al. .................. 714/47 |

* cited by examiner

*Primary Examiner* — Scott Baderman
*Assistant Examiner* — Jeison C Arcos
(74) *Attorney, Agent, or Firm* — Baker Botts L.L.P.

(57) ABSTRACT

Methods for managing response data within an information handling system (IHS), where the method includes the step of obtaining response data from at least one component in the IHS, the response data generated in response to receiving a command. The method also includes accumulating the response data from the at least one component to compute a total response time.

20 Claims, 5 Drawing Sheets

METHODS AND SYSTEMS FOR MANAGING RESPONSE DATA IN AN INFORMATION HANDLING SYSTEM

BACKGROUND

1. Technical Field

The present disclosure relates generally to information handling systems. More specifically, but without limitation, the present disclosure relates to managing response data within information handling systems.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Within an information handling system (IHS), a command may be issued by a controller to a receiving device or subsystem (e.g., blade) as part of an overall system diagnostic or self-test. The primary or host controller issuing the command waits for a response indicating the completion of the test, typically in the form of pass or failure information. In some cases, the response may be delayed based on the type or configuration (e.g., speed of a microprocessor or quantity of onboard memory) of the receiving device or the test requirements of multiple devices in a subsystem. Following a time period of no response from the receiving device, the host controller issuing the command may invoke a mechanism to account for a delayed response such as a timeout or hung test.

Currently, it is uncertain how much time elapses before a command (e.g., test command or diagnostic function) at a system level will return a response. A controller issuing a test command may receive a progress indicator periodically indicating that the test is stilt running and no timeout is yet generated. Alternatively, a host controller issuing a test command may wait for the completion of the test with no indicator of progress. Presently, in systems where a primary or a host controller attempts a diagnostic run on one of its subsystems, there is no communication between devices of the different system levels to provide feedback on the length of time for a response or timeout, therefore the host controller must wait for an arbitrary timeout. This may result in a loss of productivity and time on the part of an IHS user. Thus, a need remains for apparatus, systems, methods and media for accumulating and/or computing responses to test commands of devices and subsystems to provide a cumulative timeout value for an IHS.

SUMMARY

The following presents a general summary of several aspects of the disclosure and is not an extensive overview of the disclosure. It is not intended to identify key or critical elements of the disclosure or to delineate the scope of the claims. The following summary merely presents some concepts of the disclosure in a general form as a prelude to the more detailed description that follows.

The present disclosure provides for a method of managing response data within an information handling system (IHS) where the method includes obtaining the response data from at least one component in the IHS, wherein the response data is generated in response to receiving a command. The method may further include accumulating the response data from the at least one component to compute a total response time.

In another aspect, the disclosure provides for a computer-readable medium having stored thereon executable instructions for performing a method for managing response data within an information handling system (IHS) where the medium comprises a first instruction for obtaining the response data from at least one component in the HIS and wherein the response data generated in response to receiving a command. The medium may also comprise a second instruction for accumulating the response data from the at least one component to compute a total response time In yet another illustrative aspect, the disclosure provides for an information handling system comprising at least one component configured to generate and request response data.

BRIEF DESCRIPTION OF THE DRAWINGS

For detailed understanding of the present disclosure, references should be made to the following detailed description of the several aspects, taken in conjunction with the accompanying drawings, in which tike elements have been given like numerals and wherein.

DETAILED DESCRIPTION

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
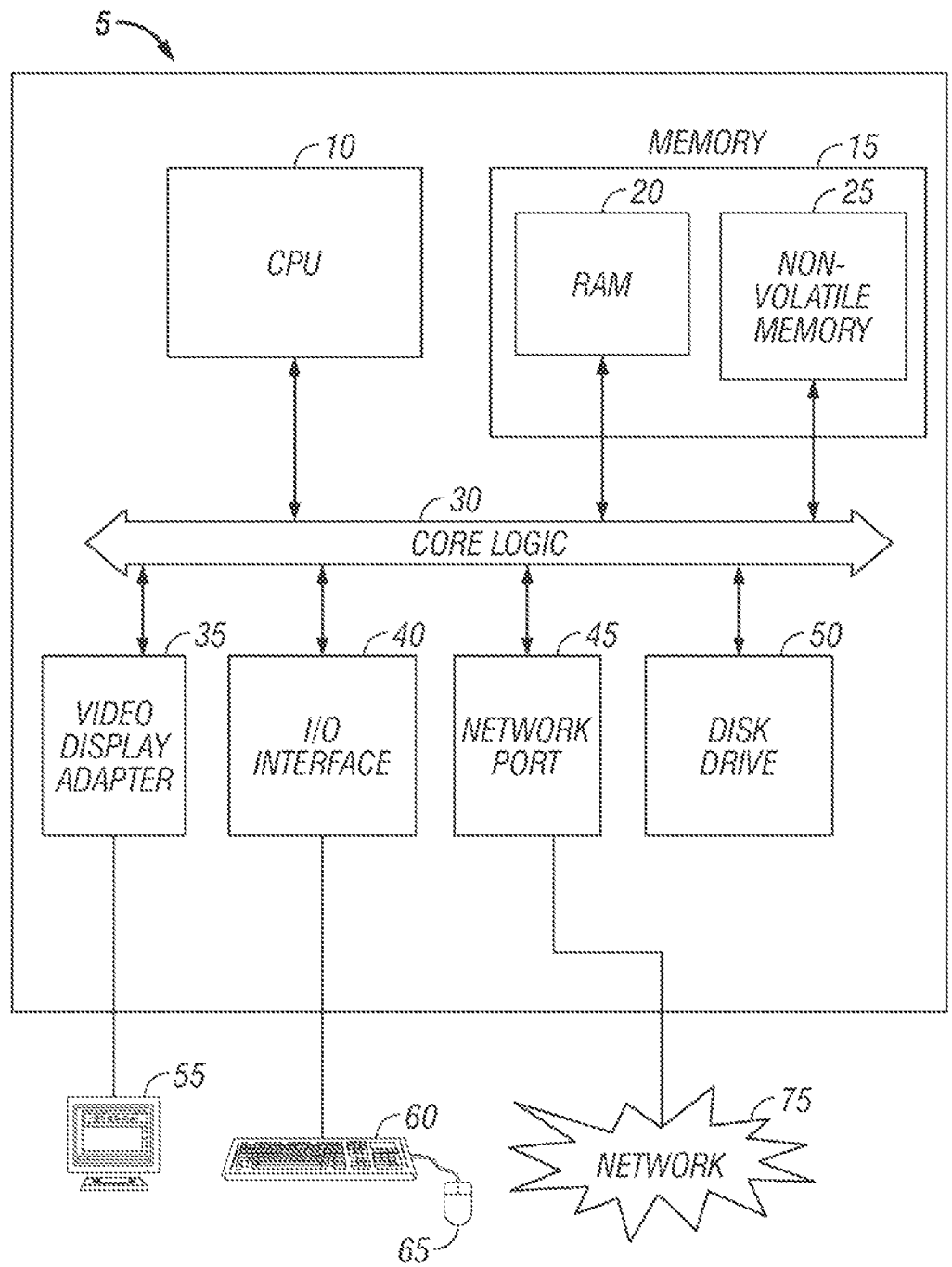
FIG. 1 depicts a possible implementation of an information handling system in accord with aspects of the disclosure.

Elements of the present disclosure can be implemented on an information handling system (IHS), as illustrated in FIG. 1. FIG. 1 depicts one possible implementation of an IHS indicated generally at 5 comprising a CPU 10. It should be understood that the present disclosure has applicability to IHSs as broadly described above, and is not intended to be limited to the IHS 5 as specifically described. The CPU 10 may comprise a processor, a microprocessor, minicomputer, or any other suitable device, including combinations and/or a plurality thereof, for executing programmed instructions. The CPU 10 may be in data communication over a local interface bus 30 with elements including memory 15 and input/output interfaces 40. The memory 15, as illustrated, may include non-volatile memory 25. The non-volatile memory 25 may include, but is not limited to, firmware flash memory and electrically erasable programmable read-only memory (EEPROM). The firmware program (not shown) may contain programming and/or executable instructions to control a keyboard 60, mouse 65, video display 55 and/or other input/output devices not shown herein. The memory may also comprise RAM 20. The operating system and application programs may be loaded into the RAM 20 for execution.

The IHS 5 may be implemented with a network port 45 to permit communication over a network 75 such as a local area network (LAN) or a wide area network (WAN), such as the Internet. As understood by those skilled in the art, IHS implementations may also include an assortment of ports and interfaces for different peripherals and components, such as video display adapters 35, disk drive ports 50, input/output interfaces 40 (e.g., keyboard 60, mouse 65) and the like.

Figure 2:
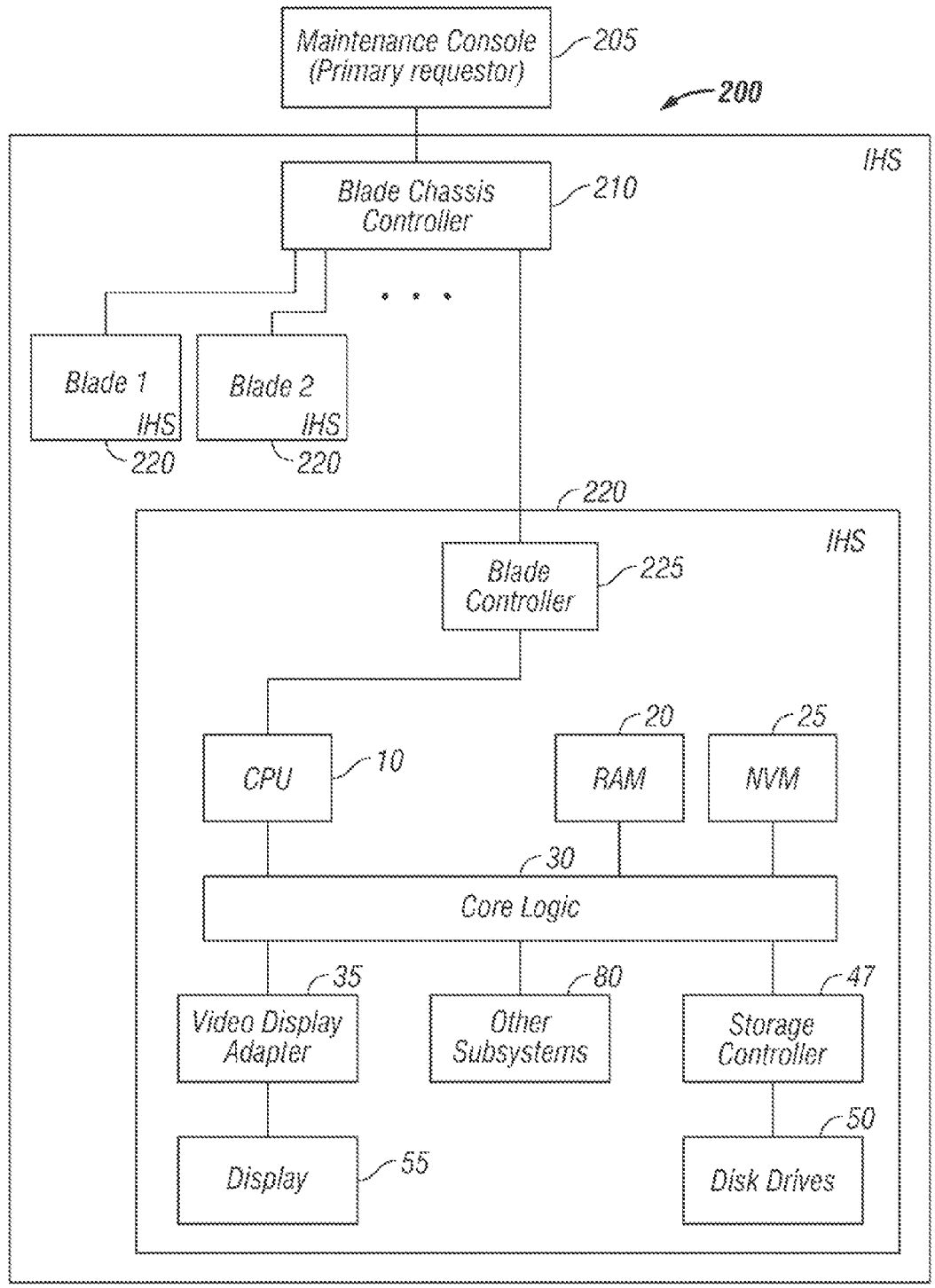
FIG. 2 depicts an illustrative implementation of a blade system in accord with aspects of the disclosure.

Now referring to FIG. 2, an IHS 200 may include a plurality of modules (e.g., blade server modules) or "blades" 220 communicatively coupled to a controller, shown as a blade chassis controller 210. The blades may include components such a blade controller 225. It will be appreciated that IHS 200 may include fewer or more blades (e.g., blade 1, blade 2, blade n) and/or components than those shown in FIG. 2 and that all such variations are within the scope of the present disclosure.

A command may be issued from a primary requestor 205, shown as a maintenance console to a blade chassis controller 210. The blade chassis controller 210 which receives the command may in turn send the command to a blade controller 225 of a receiving blade 220. A command from a blade chassis controller 210 may be sent to a blade controller 225 and/or recursively sent to other subsystems 80 such as CPU 10, video display adapter 35, display 55, storage controller 47, disk drives 50 or the like. As shown in FIG. 2, the blade controller 225 may be coupled directly to the CPU 10. The blade controller 225 may also be in communication with the CPU 10 via various media including, but not limited to, the core logic 30 and a network controller (not shown). In one implementation, a self-test or diagnostic command may be sent from a primary requestor 205 to a blade chassis controller 210 and recursively sent to a blade requesting the amount of time required for completion of the self-test.

The present disclosure contemplates that the individual blades 220 may have different configurations (e.g., speed of a microprocessor or quantity of onboard memory). The blades 220 can also have various subsystems and peripherals (not shown) or in the case of more complex systems, may have multiple input/output (I/O) controllers, each with different drive configurations that include varied processors. Each blade or server system may have multiple processing functions each of which may invoke additional processing functions. It is understood that IHS 200 may include fewer or more blades (e.g., blade 1, blade 2, blade n) and/or components than those shown in FIG. 2 and that all such variations are within the scope of the present disclosure. The expandable number "n" of blades are shown as Blade 1, Blade 2, and so on to Blade n wherein n is any integer greater than 1. In an illustrative implementation, an IHS 200 may comprise a number of n blades 220.

Figure 3:
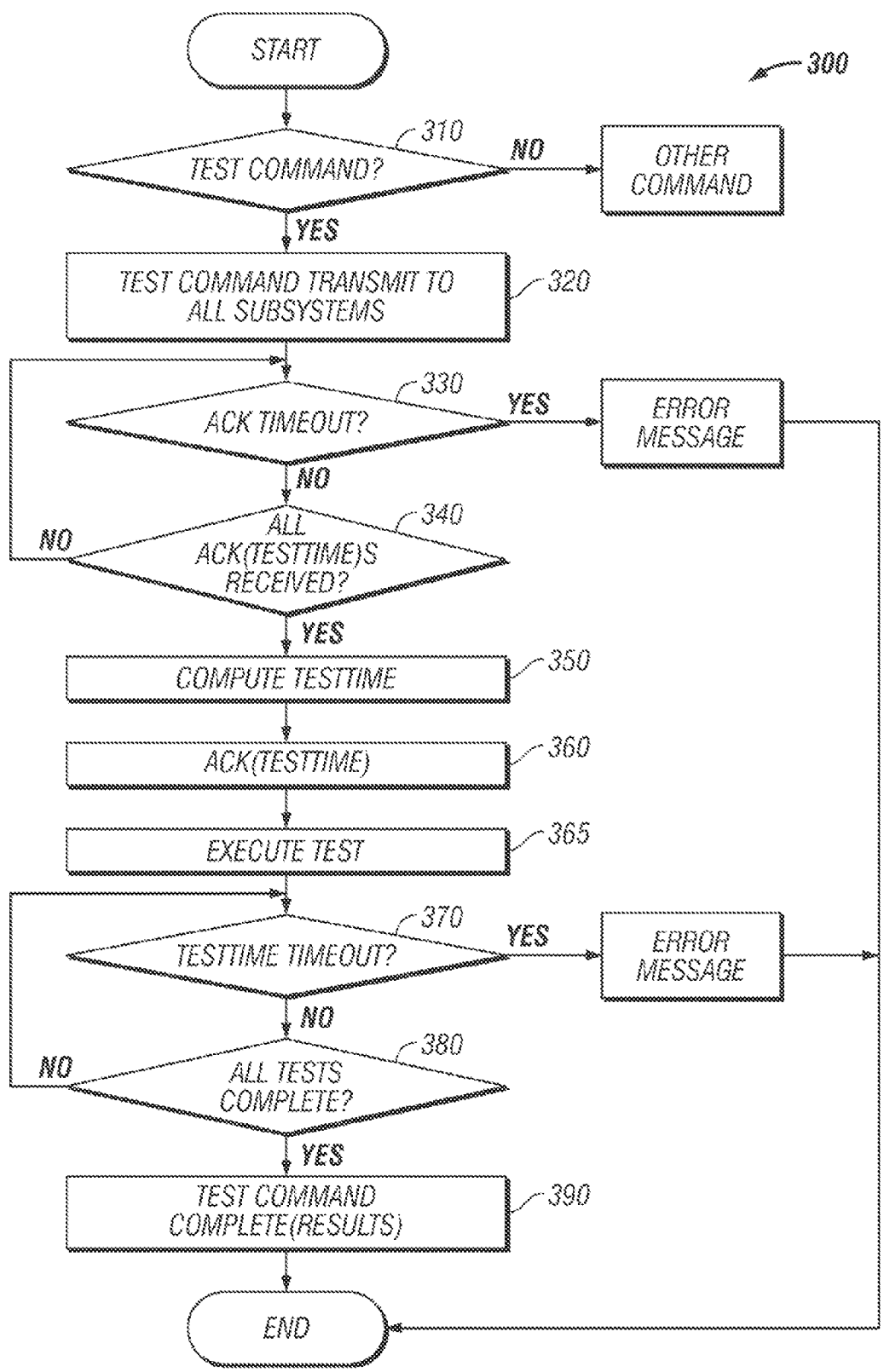
FIG. 3 is a flow diagram of an illustrative implementation of a recursive method for generating timeout values in accord with aspects of the disclosure where the timeout is computed in response to a test command.

Shown in FIG. 3 is a flowchart of a sequence 300 representing an illustrative method in accord with the present disclosure. The discussion below is intended to illustrate one possible implementation of a hierarchical or recursive method for generating and computing timeout values. It should be appreciated that a number of other methods may be utilized for generating and/or computing timeout values employing a number of different arrangements and structures, and all such variations are included within the scope of the present disclosure. Furthermore, various methods are contemplated comprising all or less than all of the steps discussed herein, any number of repeats of any of the steps below, and in any order.

In step 310, it is determined whether a test command has been issued to an IHS or a subsystem or controller within an IHS. If a test command is to be issued, the test command may then be transmitted to all subsystems in the IHS in step 320 via communication links requesting a timeout value as part of an acknowledgement that the command was received. As used herein, a subsystem may refer to any element of an IHS at any level in a system hierarchy including, but not limited to, a blade, server or processor. By way of example, within a blade system, a system controller may send a command to each of the individual blades in the system requesting a response. Additionally, an individual blade may send a test command to its processor (e.g., I/O or graphics processor). In step 330, when a command is issued to a subsystem the requester may wait for a predetermined amount of time for an event to occur (e.g. test command acknowledge) before generating a timeout (e.g., ACK TIMEOUT). ACK TIMEOUT refers to the maximum time expected for all timeouts in the hierarchy to be computed. In response to step 320, a system timeout value (e.g., ACK(TESTTIME)) is returned from all subsystems by the host controller in step 340. In one implementation, ACK(TESTTIME) responses may be generated by each subsystem in a hierarchy therefore providing feedback to a host controller regarding a predetermined period of time to complete a diagnostic self-test. In another illustrative implementation, subsystems may provide information to a host controller regarding subsystem parameters such as speed of microprocessor, amount of memory or the like.

Still referring to FIG. 3, step 350 may compute a system timeout value (e.g., TESTTIME) based on data received from all subsystems lower in the hierarchy. A host controller may compare a system timeout value with an internal timeout value, report the greater timeout value or a combination of timeout values as the total response time (e.g., TESTTIME TIMEOUT) to a requestor in step 360 and begin executing its test in 365. The longest computed TESTTIME TIMEOUT can then be used in step 370 to determine if all tests should be complete. In an illustrative implementation, more than one host controller in a system may generate and send an acknowledgement of a timeout value (e.g., ACK (TEST_TIMEOUT) to more than one requestor in parallel.

Following the completion of all tests within all subsystems in step 380, results of the test command are provided in step 390.

Figure 4:
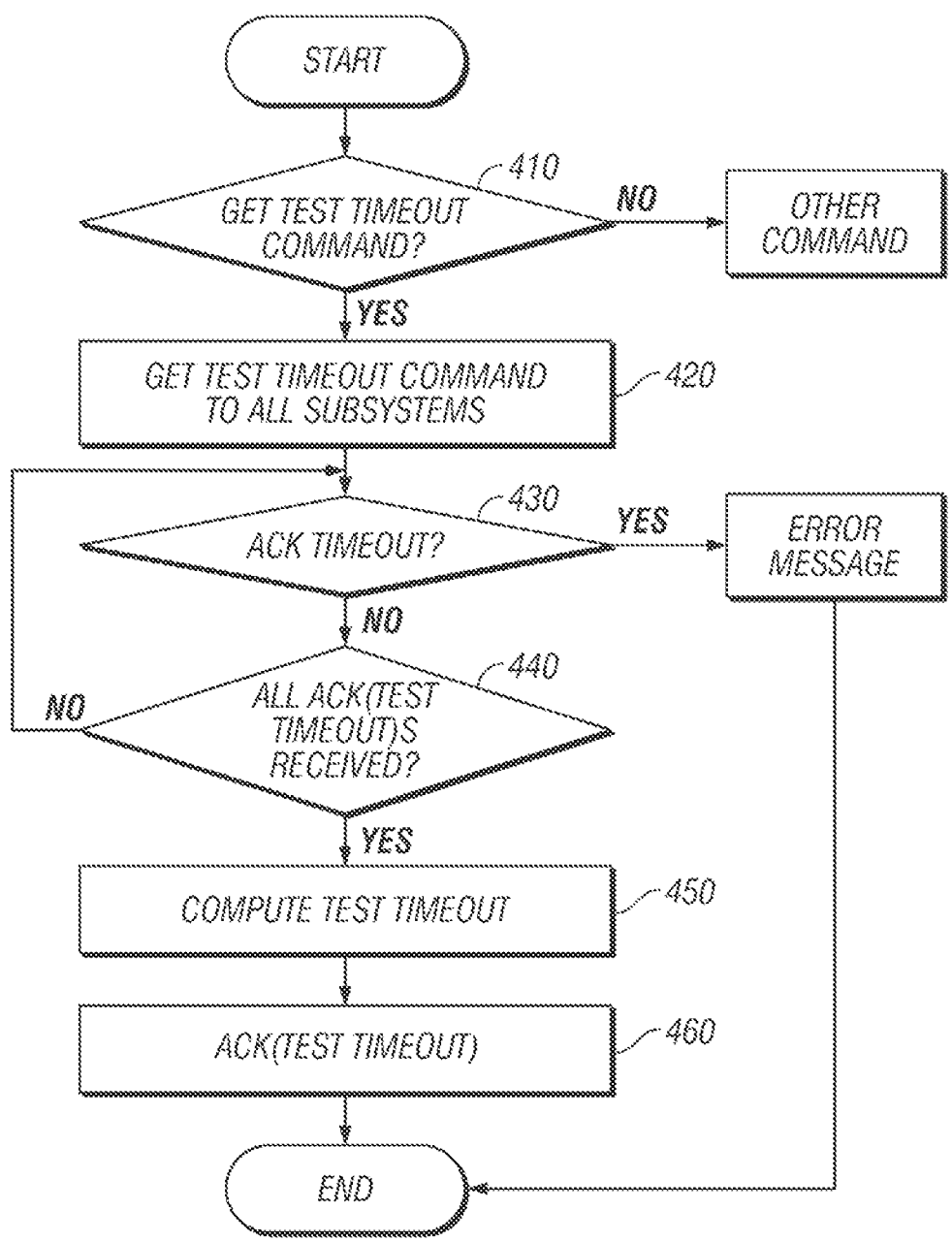
FIG. 4 is a flow diagram of an illustrative implementation of a recursive method for generating timeout values in accord with aspects of the disclosure where the timeout is discovered through a separate command.

Referring now to FIG. 4, there is shown a flowchart of a sequence 400 representing an illustrative method of determining capabilities by polling subsystems within an IHS in accord with the present disclosure. The discussion below is intended to illustrate one possible implementation of the present disclosure using a system for generating and computing timeout values. It should be appreciated that a number of other methods may be utilized for generating and/or computing timeout values employing a number of different arrangements and structures, and all such variations are included within the scope of the present disclosure. Furthermore, various methods are contemplated comprising all or less than all of the steps discussed herein, any number of repeats of any of the steps below, and in any order. Step 410 determines whether at least one subsystem within an IHS is polled prior to issuing a test command to determine its test capabilities and the duration of the test to be performed. If a subsystem is to be polled, step 420 may occur in which a command is issued to a subsystem as part of test specific capability discovery or to determine general capability. The present disclosure contemplates subsystem capabilities such as amount of memory, quantity of processors, quantity of peripherals, ability to support versions of management standards and the like.

In step 430, a subsystem may return its timeout value including the cumulative timeout values of its subsystems indicated in FIG. 4 as TEST TIMEOUT as a result of polling the subsystems. Acknowledgments of time out values (e.g., ACK(TEST TIMEOUT) are returned from all subsystems and received by a host controller in step 440. In one implementation, a subsystem may provide information to the host controller regarding subsystem parameters such as speed of microprocessor, amount of memory or the like. A system timeout value (e.g. TEST TIMEOUT) may be computed based on data received from all subsystems, according to step 450. A host controller may compare a system timeout value with an internal timeout value and report the greater timeout value or a combination of timeout values as a total response time (e.g., ACK(TEST TIMEOUT)) to a requestor, according to steps 460. In an illustrative implementation, more than one host controller in a system may generate and send ACK (TEST TIMEOUT) values to more than one requester in parallel.

Figure 5:
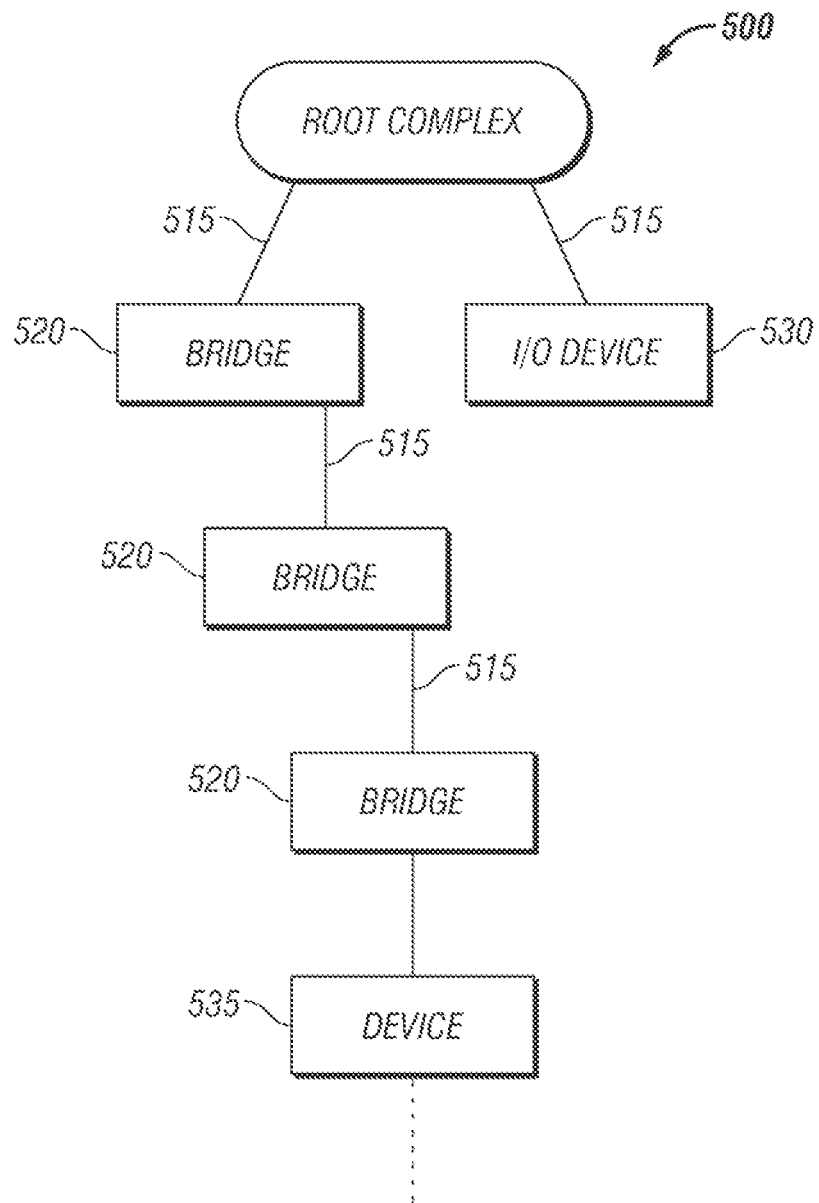
FIG. 5 depicts an illustrative implementation of a system hierarchy in accord with aspects of the disclosure.

Now referring to FIG. 5, there is shown one possible implementation of the present disclosure providing a hierarchical expansion bus system indicated generally at 500. In various illustrative implementations, the expansion bus system 500 may include a peripheral component interconnect (PCI) or other suitable bus. The expansion bus system 500 may comprise a host processor (e.g., root complex) 510 coupled to at least one bridge 520 via a communication link 515. The bridge 520 provides connectivity between two or more buses or similar or dissimilar configuration (e.g., PCI or VME). It is understood by someone of ordinary skill in the art that while a root complex is described herein, any suitable processor or controller may be used. System 500 may also comprise any additional devices 530 and 535 coupled to the root complex via communication links 515 wherein the device may include any IHS component, memory, I/O device or the like. It will be appreciated that system 500 may include fewer or more components than those shown in FIG. 2 and that all such variations are within the scope of the present disclosure.

The root complex 510 may send a command requesting response time data from a bridge 520 and/or devices 530 and 535 in the system 500. Response data may vary among the various receiving devices 530 and links 515 and may be dependent upon the configuration (e.g., data rate or bit width) of a receiving device 530 and/or link 515. Any of the above-mentioned methods may be used to generate response data or timeout values within the system 500.

In another implementation, a method according to the present disclosure provides obtaining a timeout value from a hot plug device in response to a hot plug event as part of an IHS and accumulating timeout values from the hot plug device and another component in the IHS to calculate a total timeout value. As used herein, a hot plug device may be any suitable component that can be removed from or added to an IHS while in operation or during shutdown and may include a storage device (e.g., hard drive or flash drive), expansion card (e.g., PCI-express), power supply or the like. Information related to timeout values can be dynamically obtained from a hot plug device despite a change in the system configuration. The present method may provide configuration dependent, hot plug capable test or diagnostic timeout optimization. Any of the above-mentioned methods may be used to generate response data or timeout values from a hot plug device.

Furthermore, methods of the present disclosure, detailed description and claims may be presented in terms of logic, software or software implemented aspects typically encoded on a variety of storage media or storage medium including, but not limited to, computer-readable storage medium/media, including non-transitory computer-readable storage medium/media, machine-readable storage medium/media, program storage medium/media or computer program product. Such storage media, having computer-executable instructions stored thereon, may be handled, read, sensed and/or interpreted by an IHS, such as a computer. Generally, computer-executable instructions, such as program modules, may include routines, programs, objects, components, data structures, and the like, which perform particular tasks, carry out particular methods or implement particular abstract data types. Those skilled in the art will appreciate that such storage media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

A person of skill in the art would appreciate, upon consideration of the above disclosure and accompanying drawings, that numerous modifications, additions, substitutions, variations, deletions and other changes may be made without departing in any way from the spirit or scope of the present disclosure and/or claims below. The embodiments, implementations and/or aspects of the present disclosure are, therefore, to be considered in all respects as illustrative and not restrictive.

What is claimed is:

1. A method of determining a maximum time out value for a hierarchical, hot plug capable information handling system (IHS), the method comprising:

transmitting a first test command to the subsystems in the hierarchy of the IHS;

generating a time out value from each subsystem in the hierarchy of the IHS, the time out value being generated in response to receiving the first test command by each subsystem;

polling each subsystem to obtain the generated time out value; and accumulating all generated time out values from each subsystem in the hierarchy of the IHS to compute a maximum time out expected for the entire IHS, wherein the maximum time out expected is calculated from the greatest time out value of each subsystem or a combination of time out values from more than one subsystem.

2. The method of claim 1, wherein obtaining the time out value from each subsystem occurs during a system diagnostic.

3. The method of claim 1, wherein obtaining the time out value from each subsystem comprises recursively generating the time out value.

4. The method of claim 1, wherein each subsystem is configured to request and generate a time out value; and allowing time for executing of a test command based on the maximum time expected for all the time out values of the IHS subsystems.

5. The method of claim 1, wherein at least one component of the subsystem in the IHS is a PCI device.

6. The method of claim 1, wherein at least one component of the subsystem in the IHS is a hot plug device.

7. The method of claim 1, wherein each subsystem is capable of sending a second test command to its components to determine a timeout value.

8. A non-transitory computer-readable storage medium having stored thereon executable instructions for performing a method for managing time out data within a hierarchical, hot plug capable information handling system (IHS), the medium comprising:
   a first instruction for sending a first test command to the subsystems in the hierarchy of the IHS;
   a second instruction for obtaining time out value from each subsystem in the hierarchy of the IHS, the time out value generated in response to receiving the first test command by each subsystem;
   a third instruction for polling each subsystem to obtain the time out value; and
   a fourth instruction for accumulating all the time out values from each subsystem in the hierarchy of the IHS to compute a maximum time expected for all the time out values of the entire IHS, wherein the maximum time expected is calculated from the greatest time out value of each subsystem or a combination of time out values from more than one subsystem.

9. The medium of claim 8, wherein obtaining the time out value from each subsystem occurs during a system diagnostic.

10. The medium of claim 8, wherein obtaining the time out value from each subsystem comprises recursively generating the time out value.

11. The medium of claim 8, wherein each subsystem is configured to request and generate the time out value; and a fifth instruction for allowing time for executing of a test command based on the maximum time expected for all the time out values of the HIS subsystems.

12. The medium of claim 8, wherein at least one component of the subsystem in the IHS is a PCI device.

13. The medium of claim 8, wherein at least one component of the subsystem in the IHS is a hot plug device.

14. The medium of claim 8, wherein each subsystem is capable of sending a second test command to its components to determine a timeout value.

15. An information handling system (IHS) having a hierarchy of subsystems, the system comprising:
   at least one component in a subsystem configured to generate response data, wherein the response data comprises a time out value;
   a non-transitory computer-readable storage medium disposed within the IHS, wherein executable instructions for performing a method for managing response data within the information handling system (IHS) are stored upon the medium, the executable instructions comprising:
   a first instruction for obtaining the response data from the subsystem including the at least one component within the hierarchy of the IHS, the response data being generated in response to receiving a first test command by each subsystem in the IHS;
   a second instruction for accumulating the response data from each subsystem in the hierarchy of the IHS to compute a maximum time out expected for all the time out values of the entire IHS, wherein the maximum time out expected is calculated from the greatest time out value of each subsystem or a combination of time out values from more than one subsystem; and
   a third instruction for allowing time for executing the test command based on the maximum time expected for all the time out values of the IHS.

16. The system of claim 15, wherein at least one component of the subsystem is a PCI device.

17. The system of claim 15, wherein at least one component of the subsystem in the IHS is a hot plug device.

18. The system of claim 15, wherein the first instruction for obtaining the response data from at least one component of the subsystem is executed during a system diagnostic.

19. The system of claim 15, wherein the first instruction for obtaining the response data from at least one component of the subsystem is executed by recursively generating the response data.

20. The system of claim 15, wherein each subsystem is capable of sending a second test command to its components to determine a timeout value.

* * * * *